United States Patent Office 2,702,573
Patented Feb. 22, 1955

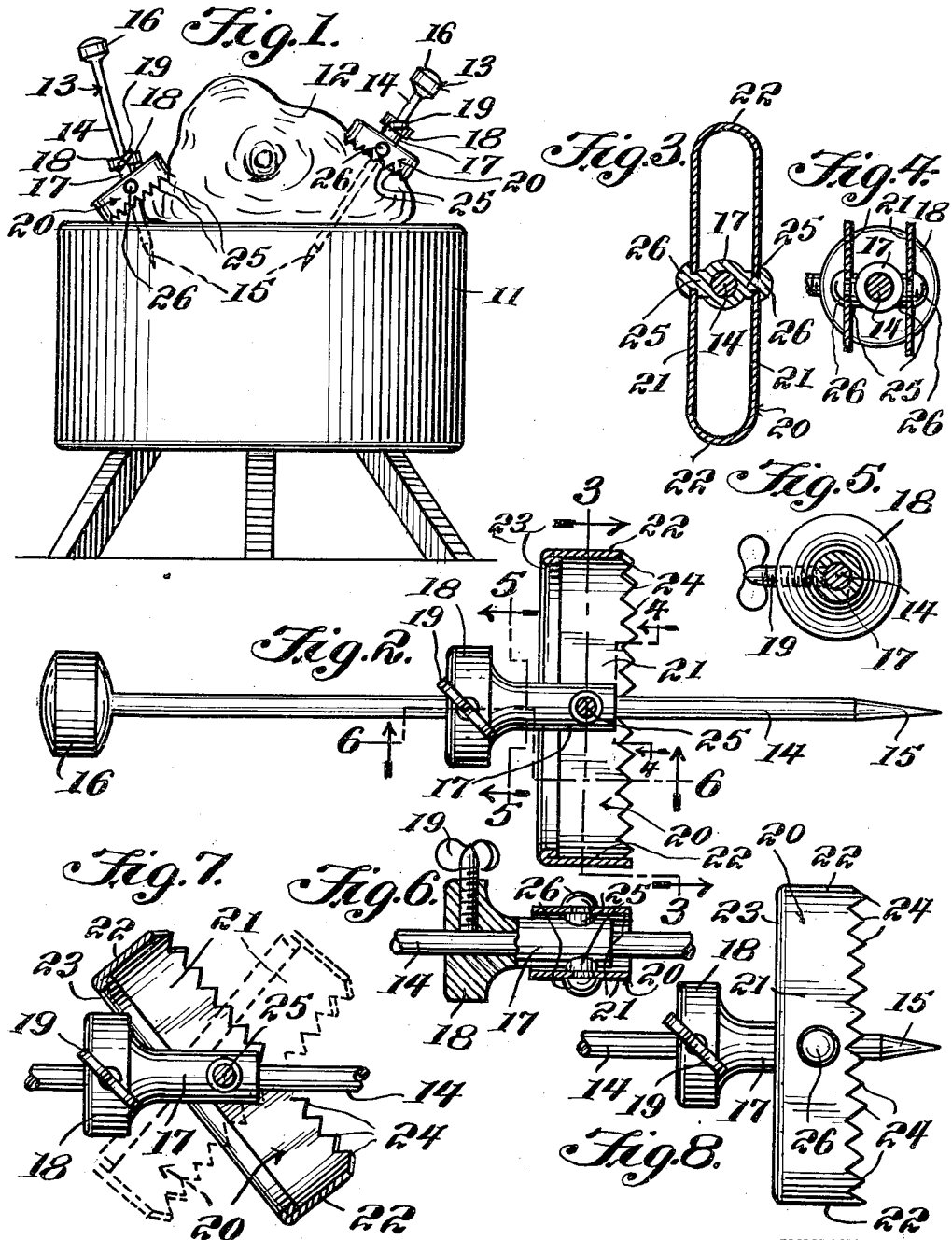

2,702,573

MEAT HOLDER

Arthur F. Splitstoser, Morris, Minn.

Application November 3, 1953, Serial No. 389,962

2 Claims. (Cl. 146—216)

This invention relates to clamp devices, and more particularly to an improved adjustable clamp which may be attached to a meat block for holding a piece of meat thereon.

The main object of the invention is to provide a novel and improved device for impaling and holding meat on a meat block, said device being simple in construction, being easy to use, and providing a substantial improvement in the facility of handling and cutting meat on a meat block.

A further object of the invention is to provide an improved meat holder which is inexpensive to manufacture, which is durable in construction, and which is arranged to firmly secure a piece of meat on a meat block and to be readily disengaged from the piece of meat when desired.

Further objects and advantages of the invention will become apparent from the following description and claims, and from the accompanying drawings, wherein:

Figure 1 is an elevational view of a meat block showing a piece of meat secured on the block by means of clamp devices according to the present invention.

Figure 2 is an enlarged longitudinal cross sectional view taken through one of the clamp devices employed in Figure 1, said view being taken transverse to the axis of the pivot studs of the clamp device.

Figure 3 is a cross sectional view taken on the line 3—3 of Figure 2.

Figure 4 is a cross sectional view taken on the line 4—4 of Figure 2.

Figure 5 is a cross sectional view taken on the line 5—5 of Figure 2.

Figure 6 is a cross sectional view taken on the line 6—6 of Figure 2.

Figure 7 is a fragmentary cross sectional view, similar to Figure 2, and showing how the clamping member may be pivoted to different positions for engaging the surface of a piece of meat.

Figure 8 is a fragmentary elevational view showing how the clamping member may be adjusted to a position adjacent the point of the shank portion of the clamp device.

Referring to the drawings, 11 designates a conventional meat block on which a piece of meat 12 is placed and which is secured on the block 11 by means of clamp devices 13 according to the present invention.

Each of the clamp devices 13 comprises a pointed shank 14 provided with the point 15 and with the driving head 16 at the other end, said head 16 being of substantial area and being adapted to be driven by any suitable implement to embed the point 15 into the meat block 11. Designated at 17 is a sleeve member which is slidably engaged on the shank 14 and which is provided with the enlarged head portion 18 through which is threaded the wing screw 19, said screw being clampingly engageable with the shank 14 to lock the sleeve 17 in an adjusted position on the shank.

Designated at 20 is a loop member of substantially rigid material, such as suitable corrosion-resistant metal, said loop member having the parallel side wall portions 21, 21 and the curved opposite bight portions 22, 22. The loop member 20 is provided with the reinforcing bead 23 at its top edge and with the serrations or teeth 24 at its bottom edge. The intermediate portions of the parallel wall elements 21, 21 are pivotally connected to the sleeve 17 by being rotatably engaged on opposing stud elements 25, 25 projecting in diametrically opposite positions from the sleeve. The pivot studs 25, 25 are provided with the respective rivet heads 26, 26 which retain the walls 21, 21 in pivotal engagement on the studs 25, 25.

As is clearly shown in Figure 2, the reduced lower portion of the sleeve 17 is received between the walls 21, 21 of the loop member 20 and the enlarged head portion of said sleeve is located a substantial distance above the top rim of the loop member 20, whereby the loop member is free to rotate through substantial angles relative to the sleeve 17 without interference from the enlarged head 18, while at the same time, access to the head 18 is available for tightening or loosening the thumb screw 19.

In using the device, the shank 14 is driven into the block 11, as for example, through the piece of meat 12 to be clamped, as shown in Figure 1, or laterally adjacent the piece of meat, the clamp loop 20 being then adjusted to engage the piece of meat and to firmly secure the meat to the block. The loop 20 is, of course, fastened in clamping position by tightening the thumb screw 19.

As shown in Figure 8, the clamping member 20 may be secured adjacent the pointed portion 15 of the shank when it is desired to clamp relatively thin pieces of meat to the block.

The shank 14 may be driven into the block either by the use of a suitable implement, as above described, or merely by a blow of the hand. Thus, the device may be rapidly engaged with the piece of meat to be held by a blow of the hand on the head 16 and then by the rapid manipulation of the clamping member 20 to engage the surface of the meat, the clamping member 20 being then locked by tightening the set screw 19.

While a specific embodiment of an improved meat holding device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A meat holder comprising a pointed shank adapted to be engaged in a meat block, a closed loop member of substantially rigid material receiving the shank therein, and transverse pivot means pivotally connecting said loop member at its intermediate portion to the intermediate portion of said shank.

2. A meat holder comprising a pointed shank adapted to be engaged in a meat block, a closed loop member of substantially rigid material, said loop member having a serrated bottom edge, a sleeve member disposed within said loop member at the intermediate portion of said loop member, transverse pivot means pivotally connecting said sleeve member to the loop member, said sleeve member slidably receiving said shank, and means on said sleeve member clampingly engaging said shank.

References Cited in the file of this patent

UNITED STATES PATENTS

| | | |
|---|---|---|
| 399,024 | Engel | Mar. 5, 1889 |
| 1,390,551 | Harrington | Sept. 13, 1921 |
| 1,871,713 | Lowenthal | Aug. 16, 1932 |